Patented Dec. 25, 1923.

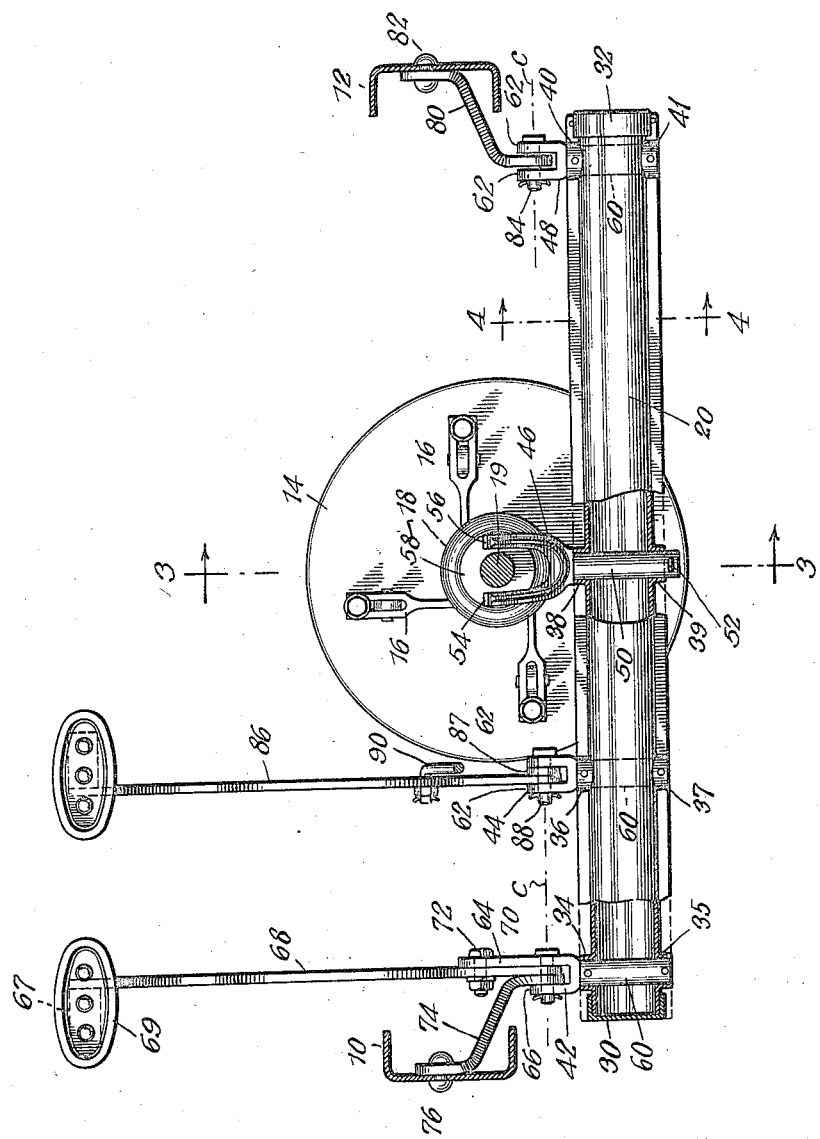

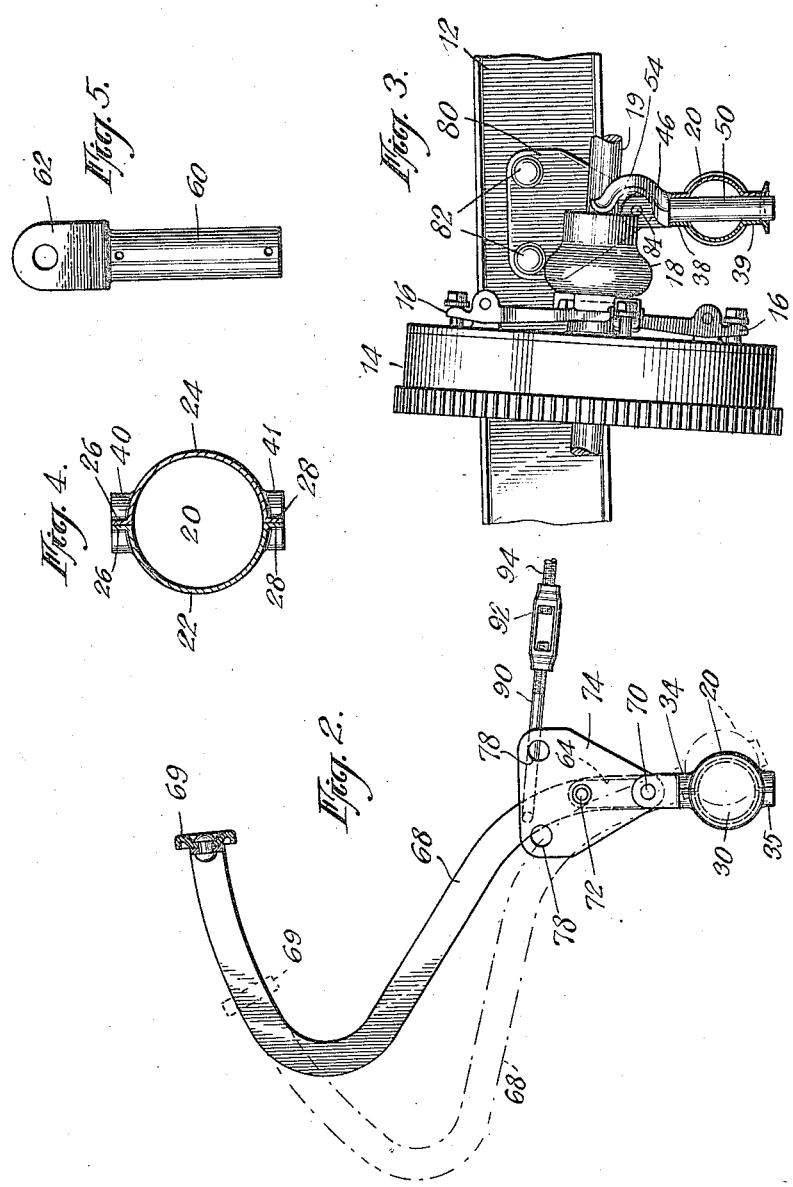

1,478,407

UNITED STATES PATENT OFFICE.

ALFRED T. STURT, OF FLINT, MICHIGAN, ASSIGNOR TO DURANT MOTORS INCORPORATED, A CORPORATION OF DELAWARE.

CLUTCH AND BRAKE PEDAL MECHANISM.

Application filed June 3, 1922. Serial No. 565,755.

*To all whom it may concern:*

Be it known that I, ALFRED T. STURT, a citizen of the United States, and a resident of Flint, county of Genesee, State of Michigan, have invented certain new and useful Improvements in Clutch and Brake Pedal Mechanism, of which the following is a specification.

This invention relates to motor vehicles and particularly to improved means for mounting the clutch and brake pedals thereof and to the means for operating the clutches of said vehicles.

One object of the invention is to provide a mounting for the clutch and brake pedals which can be assembled as a single unit.

Another object is to simplify the construction of the brake and clutch mechanism.

Another object is to provide mechanism for operating the clutch and brake of a motor vehicle which is lighter in weight than devices heretofore used yet amply as strong.

A further object is to reduce the number of parts necessary to operate the clutch and brake of such vehicles.

Another object is to provide a single cross member to support the clutch and brake pedals.

A further object is to form said cross member of hollow pressed metal of generous diameter yet of light weight.

Another object is to provide a swivel clutch operating yoke to equalize the pressure on both sides of the clutch collar.

A further object is to combine and organize the various elements herein described so that they singly and jointly perform the functions set forth.

The invention will be understood from the following description when read in connection with the accompanying drawings illustrating one embodiment thereof and in which:

Fig. 1 is a transverse section of a motor vehicle showing the clutch and service brake pedals, the mounting therefor and the clutch.

Fig. 2 is a side elevation of the clutch and brake pedal assembly and the mounting therefor detached from the chassis.

Fig. 3 is a section on line 3—3 of Fig. 1, the clutch being shown in elevation.

Fig. 4 is a detail section on line 4—4 of Fig. 1 showing the construction of the hollow supporting and operating member.

Fig. 5 is a detail of bearing member shown in Fig. 1.

Referring in detail to the drawings 10 and 12 represent the longitudinal side members of the chassis or frame which may be of any suitable or usual construction, and 14 represents a suitable clutch carrying dogs 16 pivoted at 18 and adapted to be rocked by a clutch collar 18 slidable on a drive shaft 19. The clutch and clutch collar are not shown in detail nor specifically described as they form no part of the present invention, it only being necessary to here state that movement to the left of the clutch collar 18 disengages the clutch from the engine drive.

Improved means are provided for moving the clutch collar and also for mounting the clutch pedal. These means include a cross member 20 which is formed of two duplicate pressed metal sections 22 and 24 having longitudinal flanges 26 and 28 which are spot welded or otherwise secured to each other to form a substantially cylindrical tube. Caps 30 and 32 are secured to the ends of the tube to close the ends thereof and flanges are struck up from the sections to form opposite bosses 34—35, 36—37, 38—39, 40—41, as shown in Fig. 1.

Fittings 42 and 44, a yoke 46, and a fitting 48 are seated in said bosses. The yoke 46 is provided with a shank 50 which is adapted to swivel within the hubs 38 and 39 and a cotter pin 52 is provided to prevent upward movement of said yoke. The fingers 54 and 56 of the yoke engage the rear face 58 of the clutch collar 18 and are adapted to shift said collar when the member 20 is moved, as hereinafter described.

The fittings 44 and 48 are identical in size and shape and each comprises a shank 60 and bifurcated ears 62. The shank of the fitting 44 is riveted or otherwise secured to the bosses 36 and 37 and the fitting 48 is likewise secured to the bosses 40 and 41. The fitting 42 is slightly different from the others being provided with an extended arm 64 and a short ear 66.

The clutch pedal 68 is provided with an integral ear 67 to which is secured a foot pad 69 and said pedal is secured to the extended arm 64 by a bolt 72 and a pin 70 which also projects through a hanger or bracket 74 and the short ear 66 of the fitting. The bracket 74 is offset as shown in Fig. 1 and is secured to the web of the side member 10 by rivets 76 which pass through suitable holes 78 in said bracket.

A similar bracket 80 is secured to the opposite frame member 12 by rivets 82 and a pin 84 passes through the same and through the ears of the fitting 48. The pins 70 and 84 are provided with enlarged heads and are held against longitudinal displacement by suitable cotter pins, as shown.

From the above it will be readily seen that the member 20 is pivotally hung on the pins 70 and 84 which pass through the brackets 74 and 80. These pins are in axial alinement and form a fulcrum about which the clutch yoke 46 is rocked. When the foot pad 69 of the clutch pedal is pushed forward the member 20 will be swung rearward as shown in dotted lines in Fig. 2. The fingers 54 and 56 of the clutch yoke being above the axis of the pins 70 and 84, will be swung forward at this time and thus move the collar 18 to disengage the clutch.

A brake operating pedal 86 is pivoted on a pin 88 which passes through the end thereof and through the ears 62 of the fitting 44. This pin is also in axial alinement with the pins 70 and 84 as indicated by the broken center line c.

A connecting link or rod 90 is pivotally connected to the brake pedal and may be provided with a turnbuckle 92 which is also secured to a rod 94 leading to the brake mechanism, not shown.

It will be appreciated that because the brake pedal is pivoted in alinement with the axis of movement of the clutch pedal, no movement of the latter will be effected when the brake pedal is actuated, nor will the brake pedal be moved by the actuation of the clutch pedal although they are both supported from the same cross member 20.

This arrangement is unique and eliminates the necessity of providing separate cross shafts for the brake and clutch pedals or complex sleeve arrangements. To mount the mechanism in place the brackets 74 and 80 are first secured to the chassis. The member 20, and the clutch and brake pedals and yoke 46 are then all assembled in one unit and this assembly is readily and accurately mounted on the car frame as shown by attaching the pins 70 and 84, as will be understood.

The fittings 42, 44, 46 and 48 are drop forgings and they require little machine work and can be quickly yet securely mounted in the member 20. The spacing between the ears 62 of the fittings 44 and 48 is uniform and they are interchangeable. The thickness of the clutch and brake levers and the brackets 74 and 80 is substantially uniform, and a spacing collar 87 of the same thickness is placed adjacent the pedal 86 to take up the play. The extra space between the bracket 80 and the ears of the fitting 48 allows a tolerance for variations in spacing and permits of rapid assembly.

The swivel mounting of the clutch yoke 46 permits it to automatically adjust itself so that the fingers 54 and 56 thereof bear with equal pressure on the clutch collar.

Having thus described my invention what I claim as new and desire to secure by Letters Patent is:

1. In a motor vehicle, a swinging member pivotally supported on the vehicle, a clutch pedal movable with said swinging member, a brake pedal pivotally mounted on said swinging member and a clutch actuating member movable with said swinging member.

2. In a motor vehicle, a swinging member for supporting a clutch pedal, and a clutch actuating member and means for pivotally supporting said swinging member and said clutch pedal in axial alinement.

3. In a motor vehicle, a pivotally mounted supporting member, means for moving said member, and a clutch actuating yoke mounted so as to swivel in said supporting member.

4. In a motor vehicle the combination of a clutch, a clutch collar for actuating said clutch, a yoke for shifting said collar and means for mounting said yoke so that it can swivel to exert an equal pressure on both sides of said collar.

5. In a motor vehicle the combination of a clutch, a clutch collar for actuating said clutch, and means for shifting said collar comprising a yoke having fingers engaging said collar on opposite sides of its axis of movement, said yoke having a swivelled support so that the fingers thereof will bear with equal pressure on the opposite side of said collar.

6. In a motor vehicle, a hollow sheet metal supporting member having a plurality of fittings secured thereto, means associated with certain of said fittings for pivotally supporting said supporting member, a brake pedal secured to one of said fittings, a clutch pedal secured to another of said fittings and a clutch operating yoke carried by said supporting member.

7. In a motor vehicle, a hollow sheet metal supporting member formed of two complementary half sections joined to each other, a plurality of fittings secured to said supporting member, brackets carried by the vehicle frame, means for pivotally securing certain of said fittings to said brackets, a clutch operating yoke carried by said supporting member, and a pedal secured to one of said fittings for moving said supporting member.

8. In a motor vehicle, a hollow sheet metal supporting member formed of two complementary half sections joined to each other, a plurality of fittings secured to said supporting member, brackets carried by the vehicle frame, means for pivotally securing certain of said fittings to said brackets, a clutch operating yoke mounted to swivel in said supporting member, a pedal movable with one of said fittings for swinging said supporting member and a brake pedal pivoted to one of said fittings and adapted to be actuated without moving said supporting member.

In witness whereof I have hereunto set my hand at Long Island City, county of Queens, State of New York, this 31 day of May, 1922.

ALFRED T. STURT.